(12) United States Patent
Baruch et al.

(10) Patent No.: US 10,185,503 B1
(45) Date of Patent: Jan. 22, 2019

(54) CONSISTENCY GROUP FAULT TOLERANCE

(71) Applicant: EMC Corporation, Hopkinton, MA (US)

(72) Inventors: Leehod Baruch, Rishon Leziyon (IL); Asaf Natanzon, Tel Aviv (IL); Alex Solan, Hertzliya (IL); Ido Singer, Nes-Ziona (IL); Asaf Bar'el, Ramat Gan (IL)

(73) Assignee: EMC IP Holding Company, Hopkinton, MA (US)

( * ) Notice: Subject to any disclaimer, the term of this patent is extended or adjusted under 35 U.S.C. 154(b) by 13 days.

(21) Appl. No.: 14/755,250

(22) Filed: Jun. 30, 2015

(51) Int. Cl.
*G06F 3/06* (2006.01)

(52) U.S. Cl.
CPC ............ *G06F 3/0619* (2013.01); *G06F 3/065* (2013.01); *G06F 3/067* (2013.01)

(58) Field of Classification Search
CPC ......... G06F 3/0619; G06F 3/065; G06F 3/067
See application file for complete search history.

(56) References Cited

U.S. PATENT DOCUMENTS

| | | | | |
|---|---|---|---|---|
| 6,067,635 A | * | 5/2000 | DeKoning | G06F 11/1084 711/114 |
| 7,120,769 B2 | | 10/2006 | Yagawa | |
| 7,266,652 B1 | * | 9/2007 | Hotle | G06F 11/2064 711/158 |
| 7,693,880 B1 | * | 4/2010 | Ranade | G06F 17/30212 707/999.203 |
| 8,234,465 B1 | * | 7/2012 | Srinivasan | G06F 11/2064 711/114 |
| 8,271,441 B1 | * | 9/2012 | Natanzon | G06F 11/1471 707/634 |
| 8,433,869 B1 | * | 4/2013 | Natanzon | G06F 3/065 707/634 |
| 8,478,955 B1 | * | 7/2013 | Natanzon | G06F 9/45558 707/648 |
| 8,600,945 B1 | * | 12/2013 | Natanzon | G06F 17/00 707/648 |
| 2008/0082770 A1 | * | 4/2008 | Ahal | G06F 11/1471 711/162 |
| 2010/0017574 A1 | | 1/2010 | Takahashi | |
| 2012/0079224 A1 | * | 3/2012 | Clayton | G06F 11/1456 711/162 |

OTHER PUBLICATIONS

Minwen Ji, Alistair Veitch, John Wilkes, Seneca: remote mirroring done write.,Proceedings of USENIX Technical Conference (San Antonio, TX), pp. 253-268, Jun. 2003.*

* cited by examiner

*Primary Examiner* — Ramon A. Mercado
(74) *Attorney, Agent, or Firm* — Krishnendu Gupta; Deepika Bhayana

(57) ABSTRACT

A fault tolerance computer implemented method, a computer program product, and a system for allowing asynchronous replication to continue with no lag increase due to RPA failure comprising: creating a consistency group (CG) on a first replication appliance and a shadow copy of the CG on a second replication appliance; sending input/output (IO data), via a splitter, to the CG in a first replication appliance; and sending IO data, via the splitter, to shadow copy of the CG on a second replication appliance.

15 Claims, 17 Drawing Sheets

CONSISTENCY GROUP FAULT TOLERANCE

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

RELATED APPLICATION

This application is related to U.S. application Ser. No. 14/755,239 filed on Jun. 30, 2015 and entitled "CONSISTENCY GROUP FLIPOVER", and which is hereby incorporated in its entirety by this reference.

TECHNICAL FIELD

This invention relates to data replication.

BACKGROUND

Conventionally, computer data is vital to today's organizations, and a significant part of protection against disasters may be focused on data protection. Traditionally, as solid-state memory has advanced to the point where cost of memory has become a relatively insignificant factor, organizations may be able to afford to operate with systems that store and process terabytes of data.

Generally, conventional data protection systems include tape backup drives, for storing organizational production site data on a periodic basis. Usually, such systems suffer from several drawbacks. Typically, a first drawback may be that they may require a system shutdown during backup, since the data being backed up cannot be used during the backup operation. Ordinarily, a second drawback may be that they may limit the points in time to which the production site can recover. Normally, if data is backed up on a daily basis, there may be several hours of lost data in the event of a disaster. Commonly, a third drawback may be that the data recovery process itself takes a long time.

Conventionally, data protection system may use data replication by creating a copy of the organization's production site data on a secondary backup storage system and by updating the backup with changes. Traditionally, the backup storage system may be situated in the same physical location as the production storage system, or in a physically remote location. Generally, data replication systems operate either at the application level, at the file system level, at the hypervisor level, or at the data block level.

Generally, current data protection systems may try to provide continuous data protection, which may enable the organization to roll back to any specified point in time within a recent history. Commonly, continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Typically, continuous data protection uses a technology referred to as "journaling," whereby a log is kept of changes made to the backup storage. Generally, during a recovery, the journal entries serve as successive "undo" information, enabling rollback of the backup storage to previous points in time. Traditionally, journaling was first implemented in database systems, and was later extended to broader data protection.

Commonly, one challenge to continuous data protection may be the ability of a backup site to keep pace with the data transactions of a production site, without slowing down the production site. Typically, the overhead of journaling inherently requires several data transactions at the backup site for each data transaction at the production site. Generally, as such, when data transactions occur at a high rate at the production site, the backup site may not be able to finish backing up one data transaction before the next production site data transaction occurs. Typically, if the production site is not forced to slow down, then necessarily a backlog of un-logged data transactions may build up at the backup site. Generally, without being able to satisfactorily adapt dynamically to changing data transaction rates, a continuous data protection system chokes and eventually forces the production site to shut down.

SUMMARY

A fault tolerance computer implemented method, a computer program product, and a system for allowing asynchronous replication to continue with no lag increase due to RPA failure comprising: creating a consistency group (CG) on a first replication appliance and a shadow copy of the CG on a second replication appliance; sending input/output (IO data), via a splitter, to the CG in a first replication appliance; and sending IO data, via the splitter, to shadow copy of the CG on a second replication appliance.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
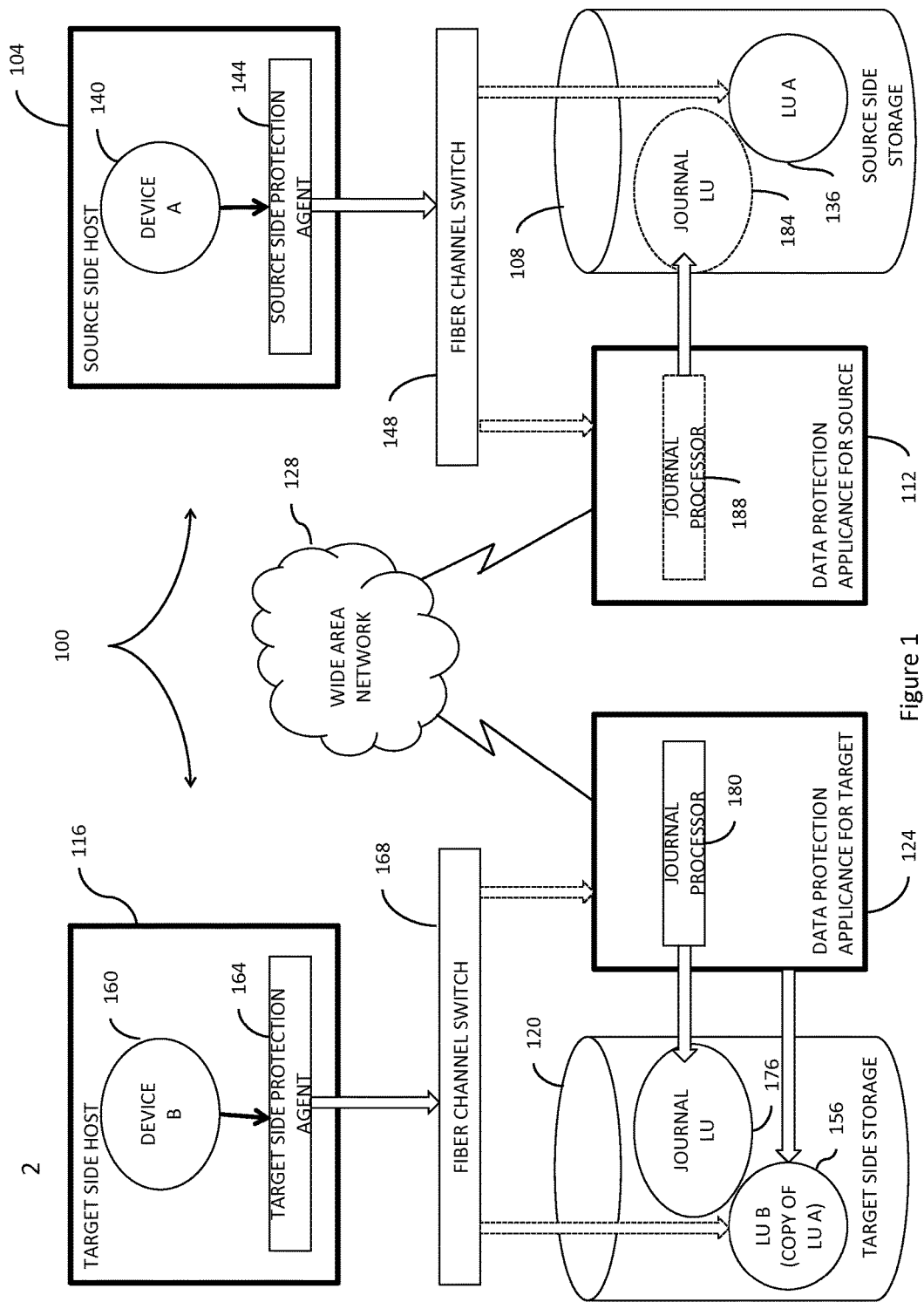
FIG. 1 is a simplified illustration of a data protection system, in accordance with an embodiment of the present disclosure.

In many embodiments, an appliance-based replication solution may involve a splitter that intercepts host write input/outputs (IOs) to a storage device. In some embodiments, intercepted IOs may be sent a replication protection appliance (RPA). In certain embodiments, intercepted IOs are sent to a storage device after the intercepted IOs are acknowledged by a replication appliance. In other embodiments, IOs are sent to a single replication appliance that may be responsible for replicating IOs.

In many embodiments, a storage device may be a volume. In certain embodiments, a volume may be replicated as part of a consistency group (CG). In some embodiments, each CG may have a single RPA that receives IOs from a splitter.

In many embodiments, a CG may move to a different RPA than the RPA on which it is operating. In certain embodiments, a CG may move to a different RPA for many reasons.

In some embodiments, a CG may move to a different RPA (target RPA) due to RPA failure. In other embodiments, a manual user intervention may be needed to balance the load between RPAs due to an RPA failure. In some embodiments, an automatic system decision may be needed to balance the load between RPAs due to an RPA failure.

In some embodiments, a reassignment of a CG in one RPA to another RPA (target RPA) in the cluster may be called a flipover or a switchover. In many embodiments, during a flipover, replication of a CG may be momentarily paused till the target RPA is ready to replicate the CG. In many embodiments, during momentary pause, a splitter may keep track of dirty regions so that when a flipover has been completed there will be a need for only short synchronization period of only the dirty regions instead of a full sweep (i.e., synchronization of all the volumes in the CGs).

In certain embodiments, a flipover may result in a temporary increase in lag between two sites. In many embodiments, a lag may be an amount of data that may be written to a production storage array rather than to a replication array. In some embodiments, lag may be the amount of data that may be lost in case of a disaster.

In many embodiments, recovery point objective (RPO) may be the amount of data that a user may be willing to lose in case of a production array disaster. In certain embodiments, a replication product may keep lag to a smaller amount than an RPO. In some embodiments, a flipover may cause a system to temporarily fail at keeping a lag amount below an RPO lag amount. In other embodiments, RPO in synchronous replication may be zero. In some embodiments, in synchronous replication flipover may mean failure to keep lag below an RPO amount.

In many embodiments, a planned flipover may be a user manual reassignment of a Cg or an automatic load balancing process. In some embodiments, in a planned flipover, a system may gradually flipover to prevent a period of pause in a replication process.

In many embodiments, a first RPA may run a CG. In certain embodiments, a planned flipover may be performed by starting a shadow copy of a CG on a second RPA that will run the CG after flipover. In some embodiments, a splitter may be directed to start splitting new IOs to a shadow copy of the CG. In other embodiments, after a first RPA completes sending all IOs that are in the memory of the first RPA to a replica site, the first RPA may signal a second RPA to start replicating IOs that the second RPA received from a splitter.

In many embodiments, unexpected flipover may occur. In certain embodiments, an RPA that runs a CG may suddenly crash. In some embodiments, to avoid increase of lag during a flipover, a system may maintain a shadow copy CG that will run on a second RPA. In some embodiments, a splitter may send IOs to a first RPA that runs the CG and to a second RPA that runs a shadow copy CG. In some embodiments, a first RPA that runs a CG may replicate data to a replica while a second RPA that runs a shadow copy CG may send data to a memory cache. In many embodiments, a synchronization protocol may notify a second RPA that runs a shadow copy CG of which IOs were transmitted to a replica. In certain embodiments, when an RPA that runs a CG crashes, a shadow copy CG may become active and may continue to replicate IOs without disruption.

In many embodiments, in synchronous replication, a splitter may delay IOs from a host to keep lag at zero between two sites. In certain embodiments, when a flipover may need to occur, a splitter may delay host IOs longer until a CG on a second RPA is active to replicate IOs. In some embodiments, a splitter may send delayed IOs to a newly assigned RPA that runs a CG. In certain embodiments, a delay in sending IOs may prevent an increase in lag above zero during a flipover at an expense of a slight delay in IOs.

In many embodiments, it may be beneficial to replicate a virtual machine and the storage associated with a virtual machine. In other embodiments, virtual replication may present complexity as there may not have been a way to access the IO for the virtual machine. In some embodiments, a splitter may run in a virtualization layer in a virtual machine. In certain embodiments, a replication appliance may run in the same virtual machine as the virtual machine being replicated. In other embodiments, a replication appliance may run in another virtual machine, which may run on the same physical machine or on another physical machine. In some embodiments, a virtual splitter may run in a first virtual machine and a replication device or virtual replication device may run in a different virtual machine.

In many embodiments, the current disclosure may enable replication in a virtual environment. In some embodiments, replication may be enabled in a virtual machine level. In most embodiments, the virtual machine may operate in a hypervisor. In certain embodiments, the hypervisor may be a VMware hypervisor or ESX. In some embodiments, the hypervisor may be a Microsoft or Citrix hypervisor. In other embodiments, there may be a virtualization layer in the hypervisor. In certain embodiments, the virtualization layer may split IOs from a virtual machine to a data protection appliance (DPA). In some embodiments, a DPA may be located in the same hypervisor as the virtual machine. In other embodiments, the DPA may be located in a different hypervisor than the virtual machine.

In some embodiments, a virtual machine may be replicated using a virtualization layer. In certain embodiments, the virtualization layer may be a virtual machine consuming volumes/file systems and exposing a different set of volumes. In many embodiments, the virtualization layer may expose a virtual machine volume (VVOL). In some embodiments, a VVOL may be consumed by a virtual machine as a disk. In other embodiments, a virtualization layer may expose a file-based protocol. In certain embodiments, a virtual machine may consume a file as a virtual disk.

The following may be helpful in understanding the specification and claims:

BACKUP SITE—may be a facility where replicated production site data is stored; the backup site may be located in a remote site or at the same location as the production site; a backup site may be a virtual or physical site CLONE—a clone may be a copy or clone of the image or images, drive or drives of a first location at a second location;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical.

DPA—may be Data Protection Appliance a computer or a cluster of computers, or a set of processes that serve as a data protection appliance, responsible for data protection services including inter alia data replication of a storage system, and journaling of I/O requests issued by a host computer to the storage system; The DPA may be a physical device, a virtual device running, or may be a combination of a virtual and physical device.

RPA—may be replication protection appliance, is another name for DPA. An RPA may be a virtual DPA or a physical DPA.

HOST—may be at least one computer or networks of computers that runs at least one data processing application that issues I/O requests to one or more storage systems; a host is an initiator with a SAN; a host may be a virtual machine HOST DEVICE—may be an internal interface in a host, to a logical storage unit;

IMAGE—may be a copy of a logical storage unit at a specific point in time;

INITIATOR—may be a node in a SAN that issues I/O requests;

JOURNAL—may be a record of write transactions issued to a storage system; used to maintain a duplicate storage system, and to rollback the duplicate storage system to a previous point in time;

LOGICAL UNIT—may be a logical entity provided by a storage system for accessing data from the storage system;

LUN—may be a logical unit number for identifying a logical unit; may also refer to one or more virtual disks or virtual LUNs, which may correspond to one or more Virtual Machines.

Management and deployment tools—may provide the means to deploy, control and manage the RP solution through the virtual environment management tools PHYSICAL STORAGE UNIT—may be a physical entity, such as a disk or an array of disks, for storing data in storage locations that can be accessed by address;

PRODUCTION SITE—may be a facility where one or more host computers run data processing applications that write data to a storage system and read data from the storage system; may be a virtual or physical site SAN—may be a storage area network of nodes that send and receive I/O and other requests, each node in the network being an initiator or a target, or both an initiator and a target;

SOURCE SIDE—may be a transmitter of data within a data replication workflow, during normal operation a production site is the source side; and during data recovery a backup site is the source side; may be a virtual or physical site SNAPSHOT—a Snapshot may refer to differential representations of an image, i.e. the snapshot may have pointers to the original volume, and may point to log volumes for changed locations. Snapshots may be combined into a snapshot array, which may represent different images over a time period.

STORAGE SYSTEM—may be a SAN entity that provides multiple logical units for access by multiple SAN initiators TARGET—may be a node in a SAN that replies to I/O requests;

TARGET SIDE—may be a receiver of data within a data replication workflow; during normal operation a back site is the target side, and during data recovery a production site is the target side; may be a virtual or physical site WAN—may be a wide area network that connects local networks and enables them to communicate with one another, such as the Internet.

SPLITTER/PROTECTION AGENT: may be an agent running either on a production host a switch or a storage array which can intercept IO and split them to a DPA and to the storage array, fail IO redirect IO or do any other manipulation to the IO; the splitter or protection agent may be used in both physical and virtual systems. The splitter may be in the IO stack of a system and may be located in the hypervisor for virtual machines.

VIRTUAL VOLUME: may be a volume which is exposed to host by a virtualization layer, the virtual volume may be spanned across more than one site and or volumes VASA: may be a set of vCenter providers that allow an administrator to manage storage Virtualization filter appliance (VFA): may be a layer in the hypervisor that has the ability intercepts and split IO from a VM being written to a virtual disk. In some embodiments, the VFA may be running on a VM in a hypervisor This is an out of mechanism that allows storage management over web based APIs.

VVOL-filter—may be a VM utilizing a specialized Virtual machine, which may provide an infrastructure that allows for introducing a "device driver" into the virtualized IO stack provided by the Virtual machine Virtual RPA (vRPA)/Virtual DPA (vDPA): may be an DPA running in a VM.

VASA may be vSphere Storage application program interfaces (APIs) for Storage Awareness.

DISTRIBUTED MIRROR: may be a mirror of a volume across distance, either metro or geo, which is accessible at all sites.

BLOCK VIRTUALIZATION: may be a layer, which takes backend storage volumes and by slicing concatenation and striping create a new set of volumes, which serve as base volumes or devices in the virtualization layer MARKING ON SPLITTER: may be a mode in a splitter where intercepted IOs are not split to an appliance and the storage, but changes (meta data) are tracked in a list and/or a bitmap and I/O is immediately sent to down the IO stack.

FAIL ALL MODE: may be a mode of a volume in the splitter where all write and read IOs intercepted by the splitter are failed to the host, but other SCSI commands like read capacity are served.

GLOBAL FAIL ALL MODE: may be a mode of a volume in the virtual layer where all write and read IOs virtual layer are failed to the host, but other SCSI commands like read capacity are served.

LOGGED ACCESS: may be an access method provided by the appliance and the splitter, in which the appliance rolls the volumes of the consistency group to the point in time the user requested and let the host access the volumes in a copy on first write base.

VIRTUAL ACCESS: may be an access method provided by the appliance and the splitter, in which the appliance exposes a virtual volume from a specific point in time to the host, the data for the virtual volume is partially stored on the remote copy and partially stored on the journal.

CDP: Continuous Data Protection, may refer to a full replica of a volume or a set of volumes along with a journal which allows any point in time access, the CDP copy is at the same site, and maybe the same storage array of the production site CRR: Continuous Remote Replica may refer to a full replica of a volume or a set of volumes along with a journal which allows any point in time access at a site remote to the production volume and on a separate storage array.

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail herein below, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.

Redirect the SCSI command to another logical unit.

Split the SCSI command by sending it first to the respective DPA. After the DPA returns an acknowledgement, send the SCSI command to its intended logical unit.

Fail a SCSI command by returning an error return code.

Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 may host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal.

Figure 2:
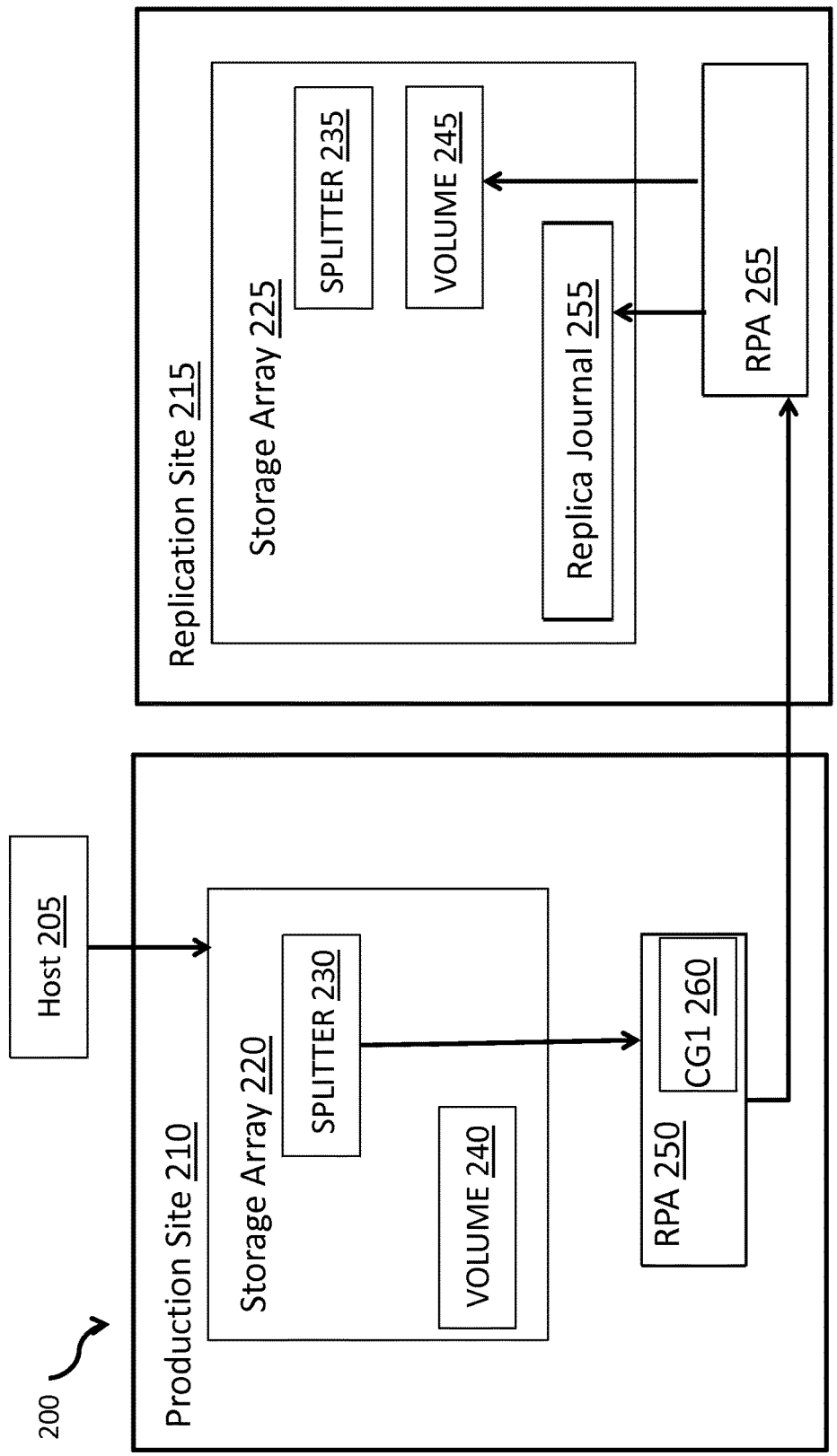
FIG. 2 is a simplified illustration of a block diagram of a system for replicating information from storage devices in accordance with an embodiment of present disclosure.

Refer now to the example embodiment of FIG. 2, which is a simplified illustration of a block diagram of a system for replicating information from storage devices. In FIG. 2, system 200 includes production site 210 and replication site 215. Production site 210 includes Storage Array 220 and RPA 250. Storage Array 220 includes volume 240 and splitter 230. RPA 250 includes CG1 260. Replication site 215 includes Storage Array 225 and RPA 265. Storage Array 225 includes volume 245, splitter 235, and replica journal 255.

Figure 3:
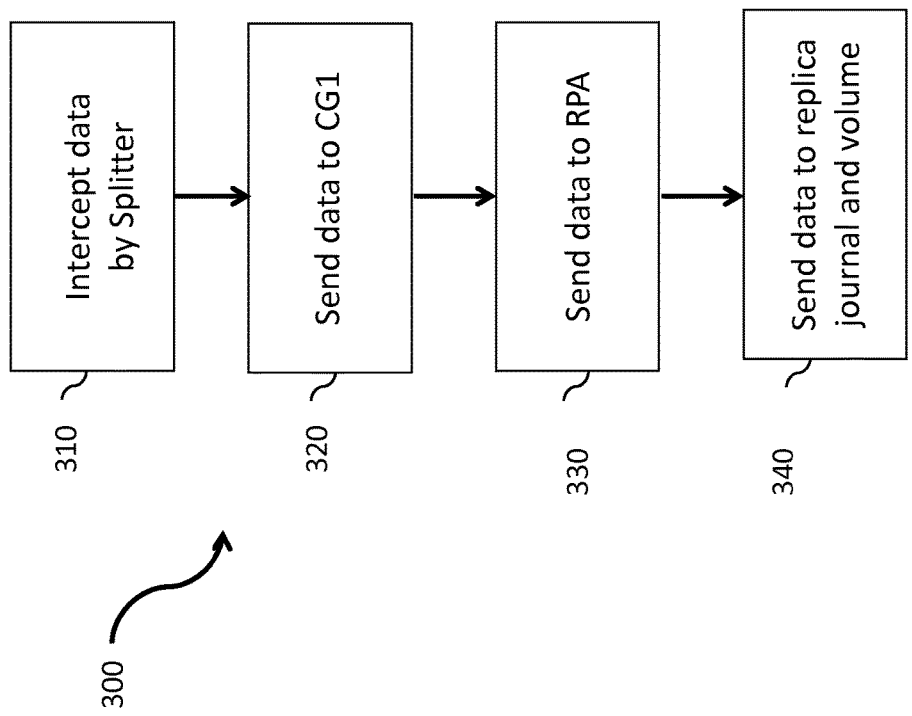
FIG. 3 is a simplified block diagram illustrating a method of a virtual machine replicating information in accordance with an embodiment of present disclosure.

Refer now to the example embodiment of FIG. 2 and FIG. 3. FIG. 3 is a simplified block diagram illustrating a method of a virtual machine replicating information. In FIG. 2, splitter 230 intercepts IO data directed to volume 240 (step 310). Splitter 230 sends IO data to CG1 260 (step 320). CG1 260 sends IO data to RPA 265 (step 330). RPA 265 sends IO data to replica journal 255 and a replica copy to volume 245 (step 340).

Figure 4:
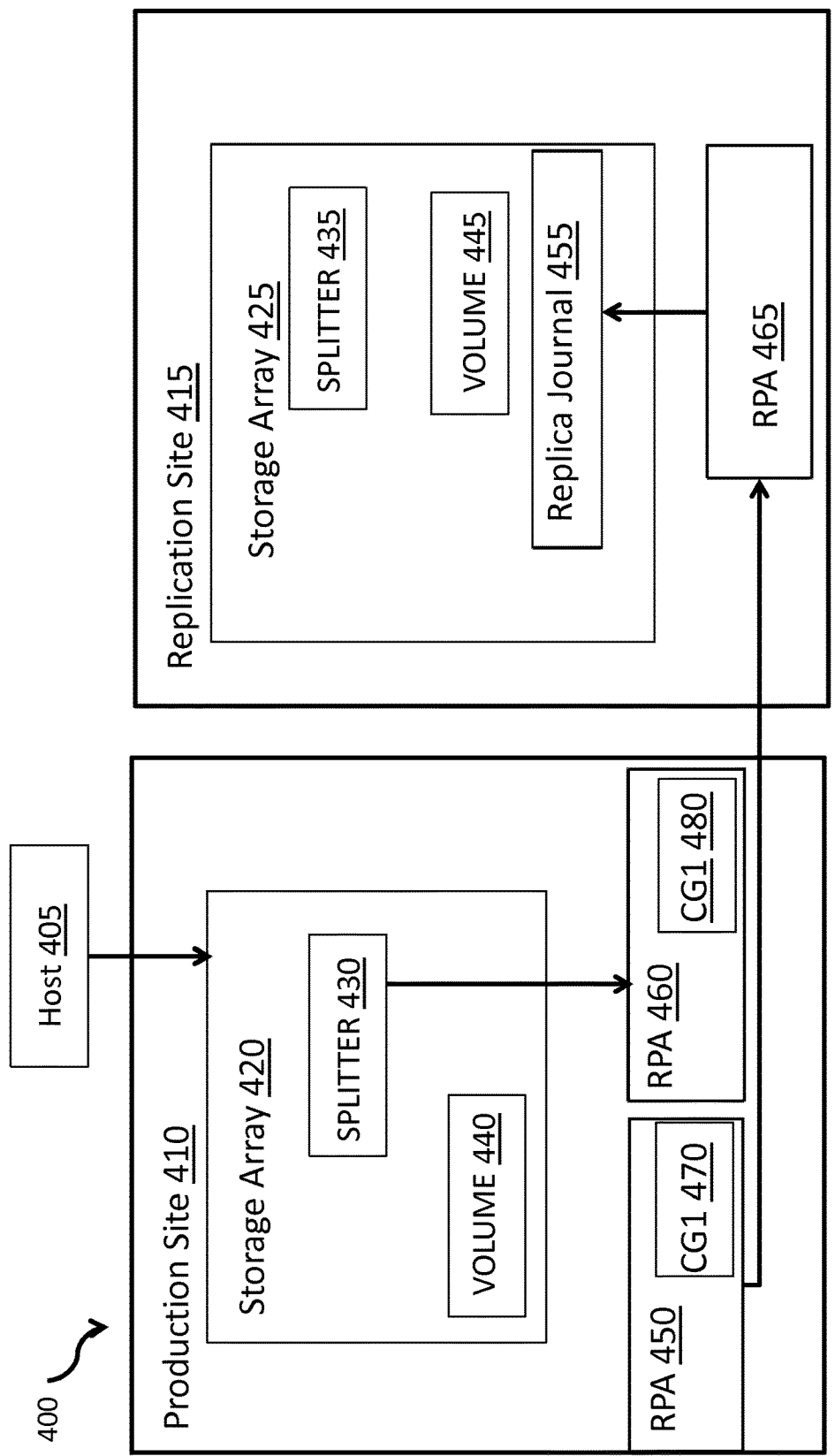
FIG. 4 is a simplified illustration of a block diagram of a system for moving a CG for asynchronous/synchronous replication to another RPA based on automatic load balancing or user action in accordance with an embodiment of present disclosure.

Refer now to the example embodiment of FIG. 4, which is a simplified illustration of a block diagram of a system for moving a CG for asynchronous/synchronous replication to another RPA based on automatic load balancing or user action. System 400 includes production site 410 and replication site 415. Production site 410 includes Storage Array 420, RPA 450, and RPA 460. Storage Array 420 includes volume 440 and splitter 430. RPA 450 includes CG1 470. RPA 460 includes shadow copy CG1 480. Shadow copy CG1 480 is a shadow copy of CG1 470. Replication site 415 includes Storage Array 425 and RPA 465. RPA 465 manages replica copy of CG1 480. Once shadow copy CG1 480 is created, either a shadow copy of shadow copy CG1 480 will be created at RPA 465 or another RPA that includes a shadow copy of shadow copy CG1 480 will be created at the replication site 415. Storage Array 425 includes volume 445, and splitter 435, and journal 455.

Figure 5:
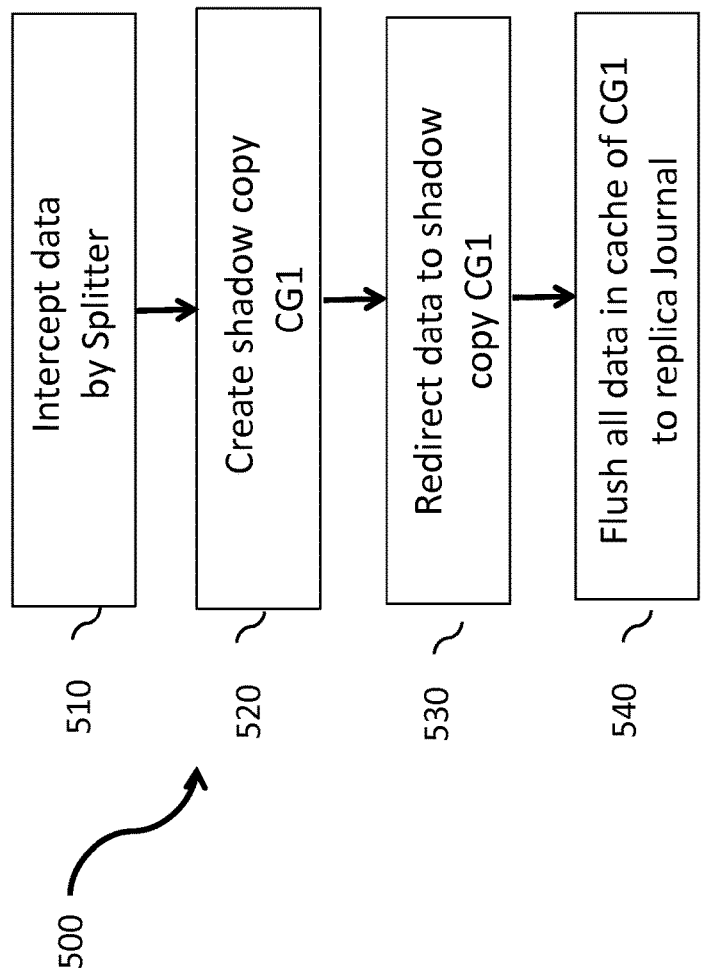
FIG. 5 is a simplified block diagram illustrating a method of moving a CG for asynchronous/synchronous replication to another RPA based on automatic load balancing or user action in accordance with an embodiment of present disclosure.

Refer now to the example embodiment of FIG. 4 and FIG. 5. FIG. 5 is a simplified block diagram illustrating a method of moving a CG for asynchronous/synchronous replication to another RPA based on automatic load balancing or user action. In FIG. 5, splitter 430 intercepts data directed to volume 440 (step 510). RPA 460 and shadow copy CG1 480 are created within production site 410 where shadow copy CG1 480 is a shadow copy of CG1 470 (step 520). Splitter 440 redirects data to shadow copy CG1 480 (step 530) as opposed to directing data to CG1 470. CG1 470 flushes data to replica journal 455 through RPA 465 (step 540).

Figure 6:
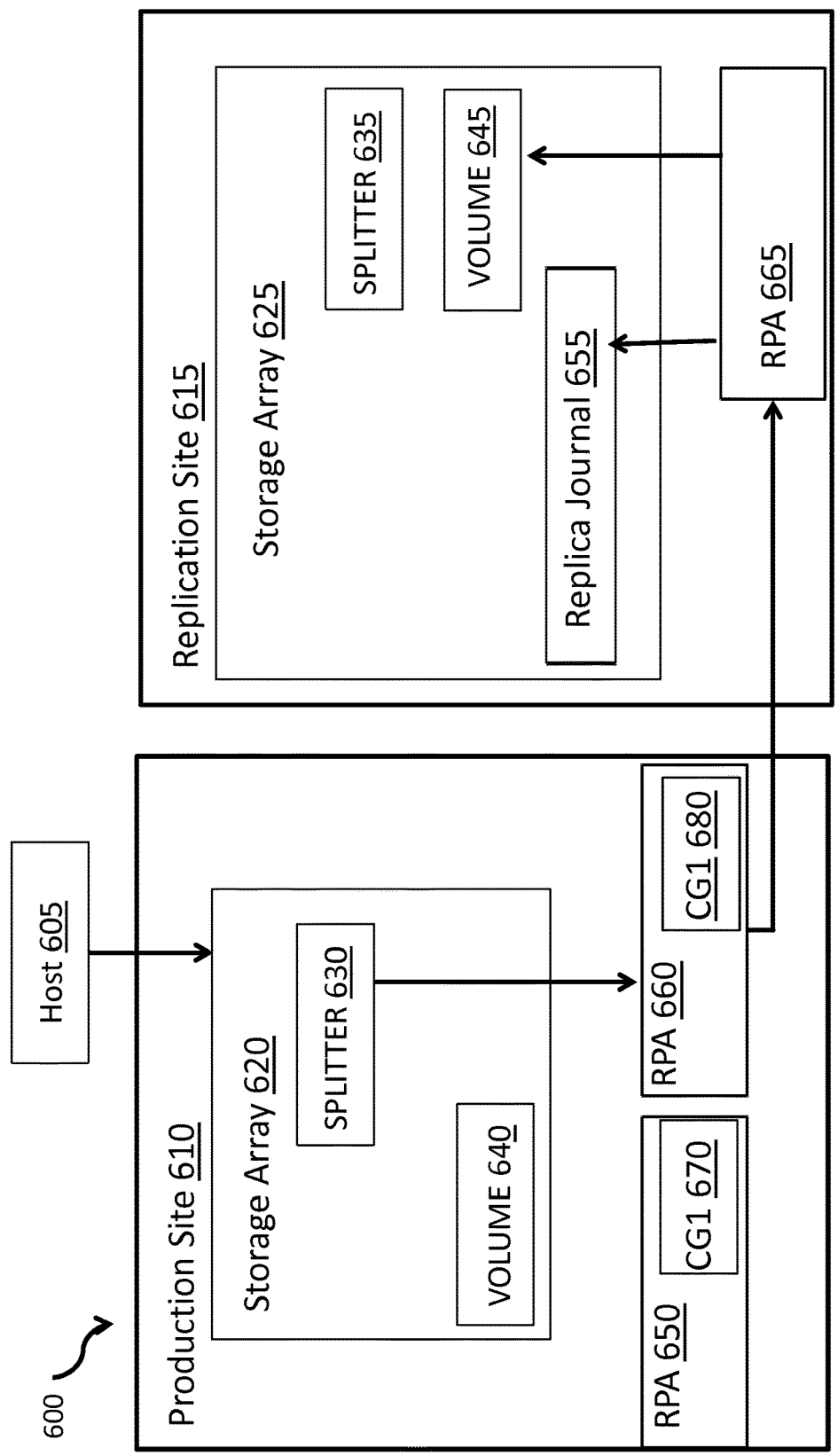
FIG. 6 is a simplified illustration of a block diagram of a system for moving a CG for asynchronous/synchronous replication to another RPA based on automatic load balancing or user action in accordance with an embodiment of present disclosure.

Refer now to example embodiment of FIG. 6, which is a simplified illustration of a block diagram of a system for moving a CG for asynchronous/synchronous replication to another RPA based on automatic load balancing or user action. System 600 includes production site 610 and replication site 615. Production site 610 includes Storage Array 620, RPA 650, and RPA 660. Storage Array 620 includes volume 640 and splitter 630. RPA 650 includes CG1 670. RPA 660 includes shadow copy CG1 680. Shadow copy CG1 680 is a shadow copy of CG1 670. Replication site 615 includes Storage Array 625 and RPA 665. RPA 665 manages replica copy of CG1 680. Once shadow copy CG1 680 is created, either a shadow copy of shadow copy CG1 680 will be created at RPA 665 or another RPA that includes a shadow copy of shadow copy CG1 680 will be created at the replication site 615. Storage Array 625 includes volume 645, splitter 635, and replica journal 655.

Figure 7:
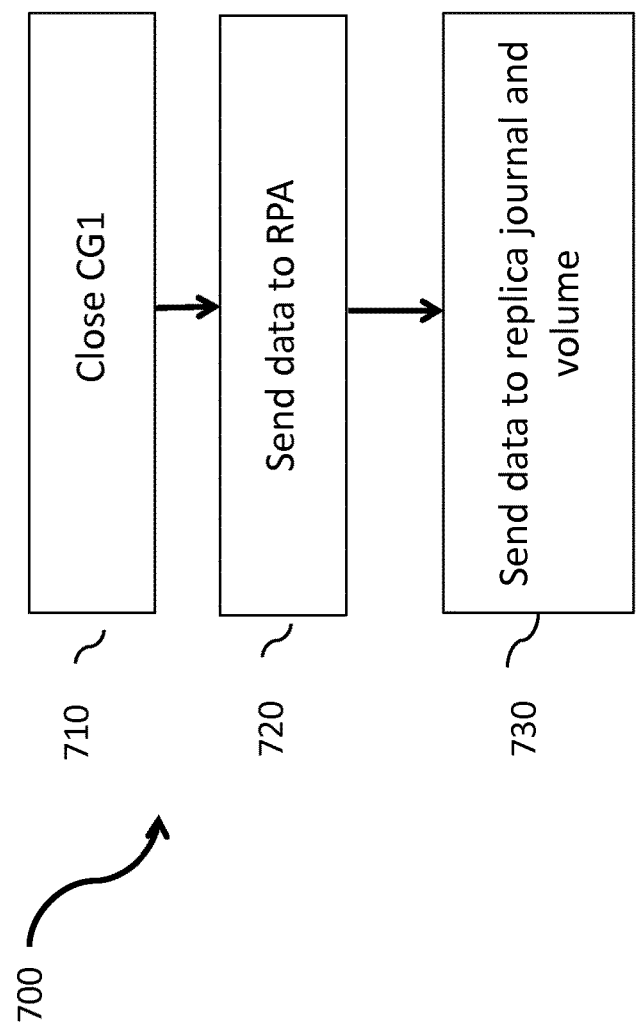
FIG. 7 is a simplified block diagram illustrating a method of moving a CG for asynchronous/synchronous replication to another RPA based on automatic load balancing or user action in accordance with an embodiment of present disclosure.

Refer now to example embodiment of FIG. 5, FIG. 6, and FIG. 7. FIG. 7 is a simplified block diagram illustrating a method of moving a CG for asynchronous/synchronous replication to another RPA based on automatic load balancing or user action. In FIG. 6, splitter 630 intercepts data directed to volume 640 (step 510). RPA 660 and shadow copy CG1 680 are created within production site 610 where shadow copy CG1 680 is a shadow copy of CG1 670 (step 520). Splitter 630 redirects data to shadow copy CG1 680 (step 530) as opposed to directing data to CG1 670. CG1 670 flushes data to replica journal 655 through RPA 665 (step 540). Storage Array 620 closes CG1 660 (step 710). Shadow copy CG1 670 sends data to RPA 665 (or another RPA depending on where the remote shadow copy was opened) (step 720). RPA 665 sends IO data to replica journal 655 and a replica copy to volume 645 through RPA 665 (step 730).

Figure 8:
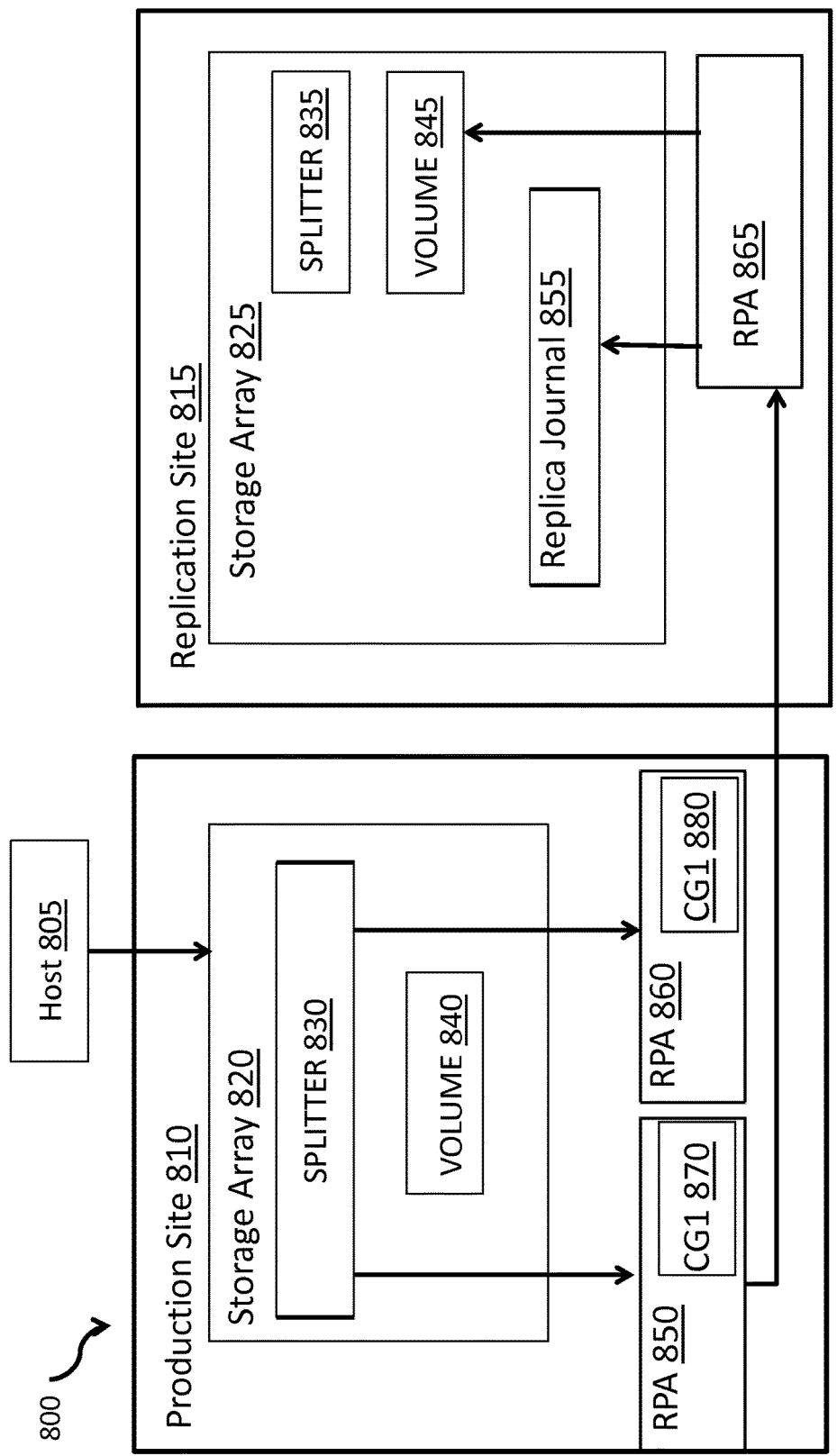
FIG. 8 is a simplified illustration of a block diagram of a fault tolerance system for allowing asynchronous replication to continue with no lag increase due to RPA failure in accordance with an embodiment of present disclosure.

Refer now to the example embodiment of FIG. 8, which is a simplified illustration of a block diagram of a fault tolerance system for allowing asynchronous replication to continue with no lag increase due to RPA failure. System 800 includes production site 810 and replication site 815. Production site 810 includes Storage Array 820, RPA 850, and RPA 860. Storage Array 820 includes volume 840 and splitter 830. RPA 850 includes CG1 870. RPA 860 includes shadow copy CG1 880. Shadow copy CG1 880 is a shadow copy of CG1 870. Replication site 815 includes Storage Array 825 and RPA 865. RPA 865 manages replica copy of CG1 880. Once shadow copy CG1 880 is created, either a shadow copy of shadow copy CG1 880 will be created at RPA 865 or another RPA that includes a shadow copy of shadow copy CG1 880 will be created at the replication site 815. Storage Array 825 includes volume 845, splitter 835, and replica journal 855.

Figure 9:
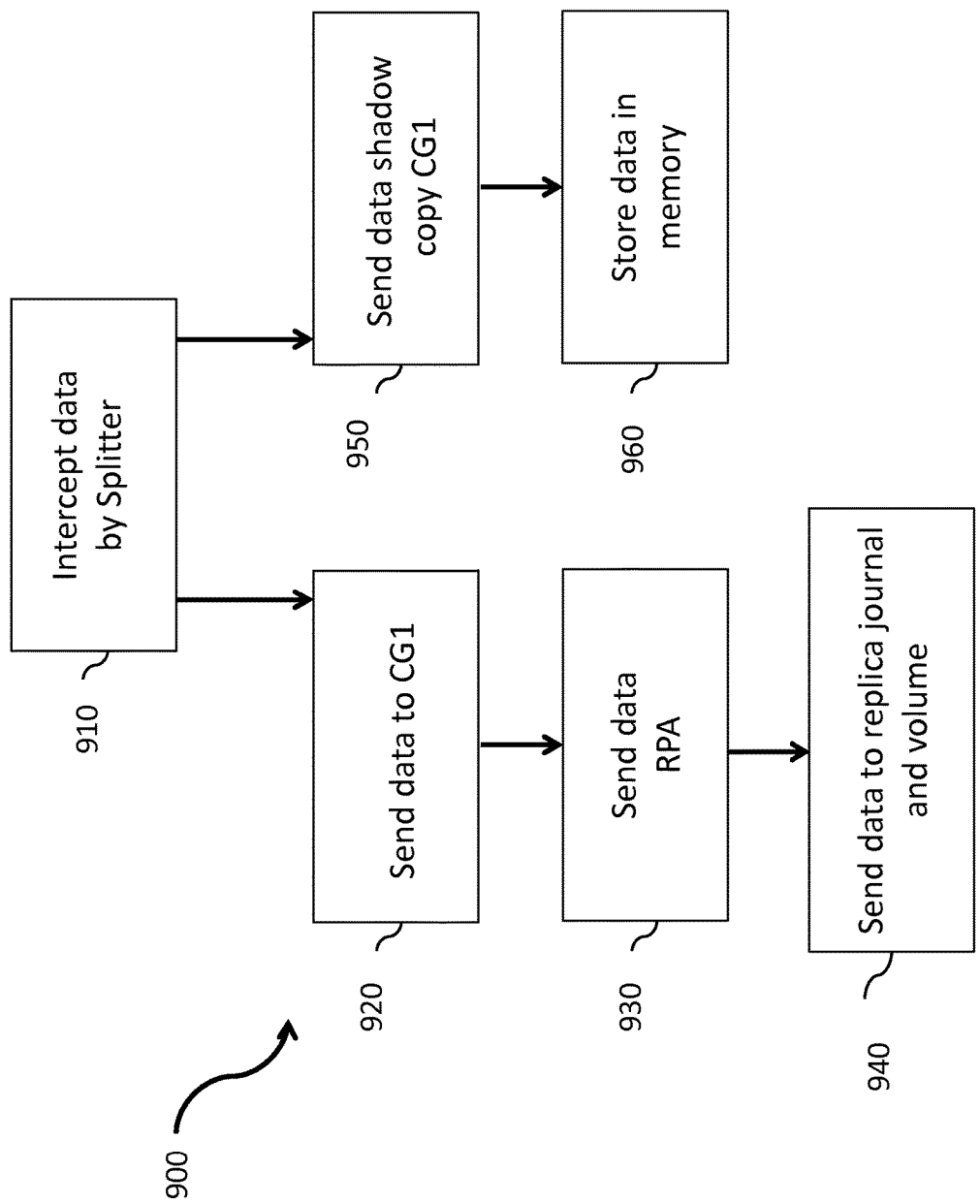
FIG. 9 is a simplified block diagram illustrating a fault tolerance method for allowing asynchronous replication to continue with no lag increase due to RPA failure in accordance with an embodiment of present disclosure.

Refer now to the example embodiment of FIG. 8 and FIG. 9. FIG. 9 is a simplified block diagram illustrating a fault tolerance method for allowing asynchronous replication to continue with no lag increase due to RPA failure. In FIG. 8, splitter 840 intercepts data from volume 830 (step 910). Splitter 840 simultaneously mirrors data to CG1 870 (step 920) and to shadow copy CG1 880 (step 950). CG1 870 sends data to RPA 865 (step 930). RPA 865 sends IO data to replica journal 855 and a replica copy to volume 845 (step 940). Shadow copy CG1 880 stores data in a cache memory (step 960).

Figure 10:
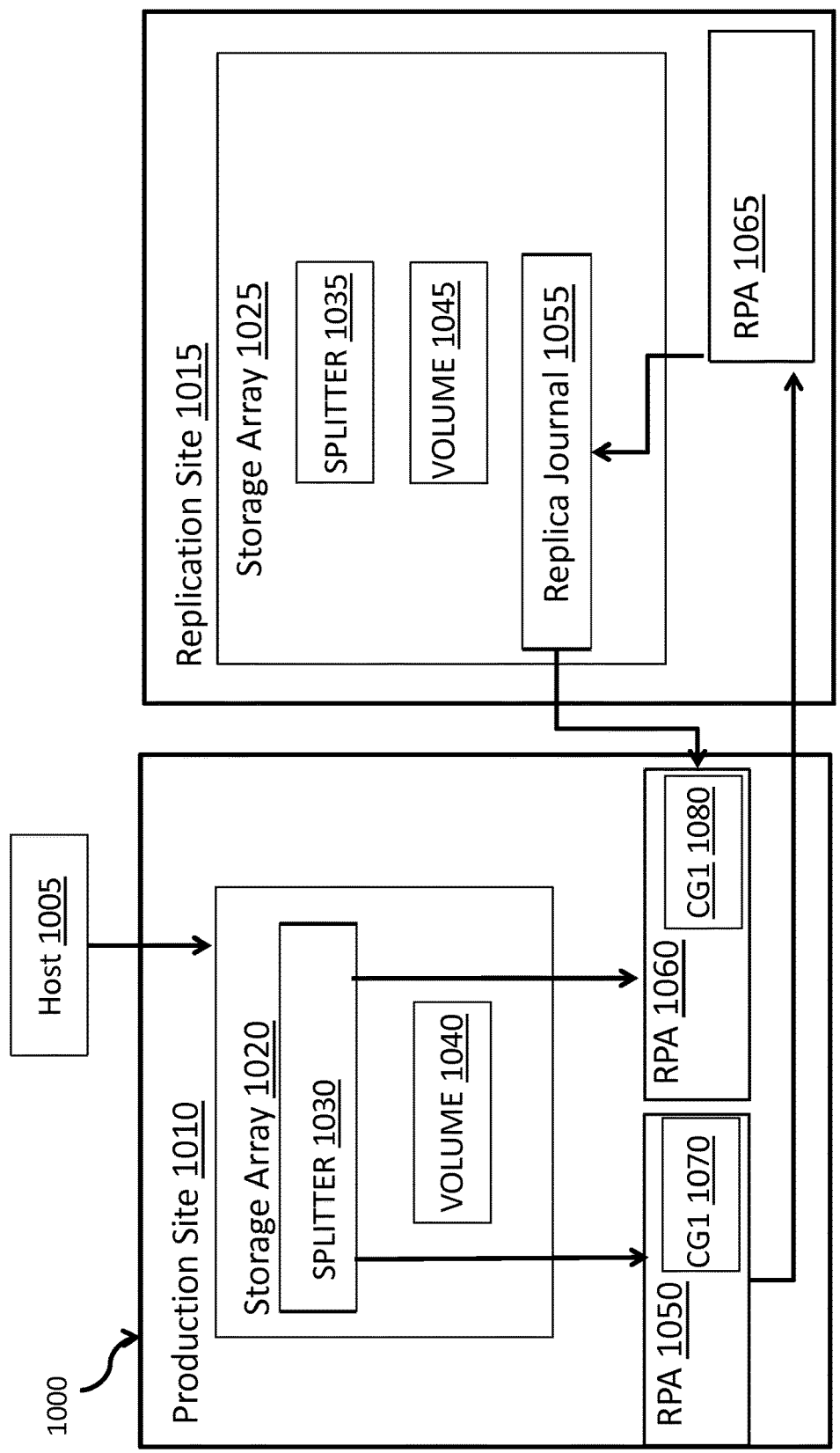
FIG. 10 is a simplified illustration of a block diagram of a fault tolerance system for allowing asynchronous replication to continue with no lag increase due to RPA failure in accordance with an embodiment of present disclosure.

Refer now to the example embodiment of FIG. 10, which is a simplified illustration of a block diagram of a fault tolerance system for allowing continuous asynchronous replication to continue with no lag increase and with any (point-in-time) PIT access due to RPA failure. System 1000 includes production site 1010 and replication site 1015. Production site 1010 includes Storage Array 1020, RPA 1050, and RPA 1060. Storage Array 1020 includes volume 1040 and splitter 1030. RPA 1050 includes CG1 1070. RPA 1060 includes shadow copy CG1 1080. Shadow copy CG1 1080 is a shadow copy of CG1 1070 that contains data that was not yet flushed to replica journal 1055 through RPA 1065. Replication site 1015 includes Storage Array 1025 and RPA 1065. RPA 1065 manages replica copy of CG1 1080. Once shadow copy CG1 1080 is created, either a shadow copy of shadow copy CG1 1080 will be created at RPA 1065 or another RPA that includes a shadow copy of shadow copy CG1 1080 will be created at the replication site 1015. Storage Array 1025 includes volume 1045, splitter 1035, and replica journal 1055.

Figure 11:
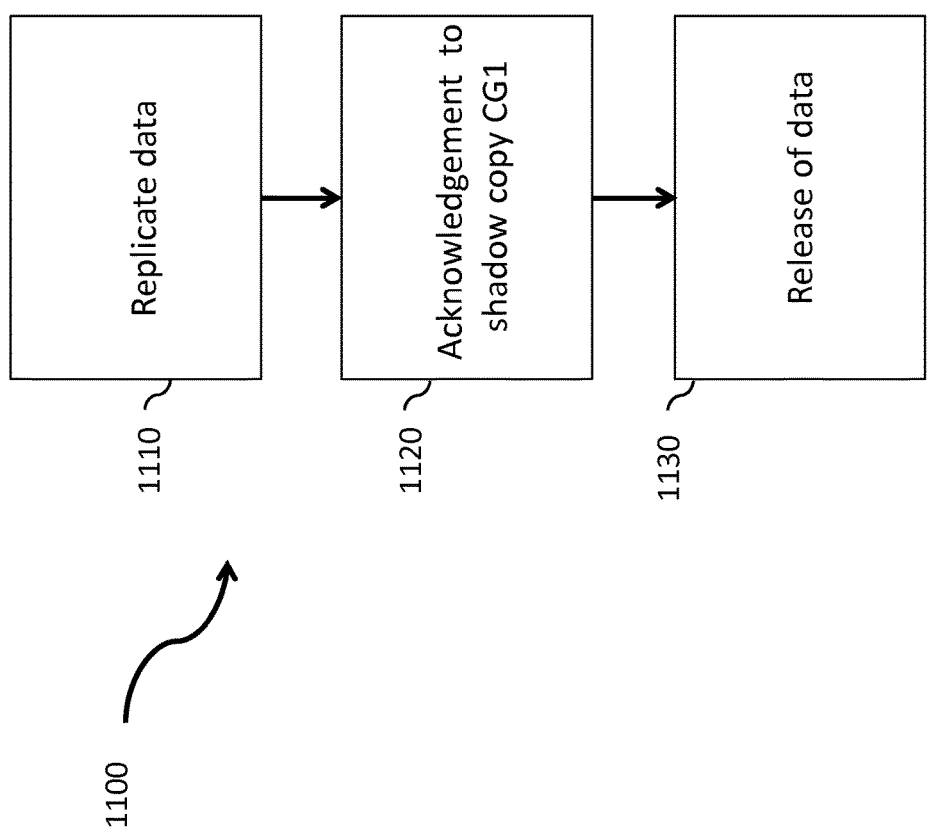
FIG. 11 is a simplified block diagram illustrating a fault tolerance method for allowing asynchronous replication to continue with no lag increase due to RPA failure in accordance with an embodiment of present disclosure.

Refer now to the example embodiment of FIG. 9, FIG. 10, and FIG. 11. FIG. 11 is a simplified block diagram illustrating a fault tolerance method for allowing asynchronous replication to continue with no lag increase due to RPA failure. In FIG. 10, splitter 1030 intercepts data directed to volume 1040 (step 910). Splitter 1030 simultaneously mirrors data to CG1 1070 (step 920) and to shadow copy CG1 1080 (step 940). RPA 1050 replicates data and flushes data from CG1 1070 to replica journal 1055 through RPA 1065 (step 1110). Shadow copy CG1 1080 stores data in cache memory that contains data that was not yet flushed to replica journal 1055 through RPA 1065 (step 950). Replica journal 1055 sends acknowledgement to shadow copy CG1 1080 of flushed data to replica journal from CG1 1070 (step 1120). Shadow copy CG1 1080 releases data from memory to replica journal 1055 through RPA 1065 (step 1130).

Figure 12:
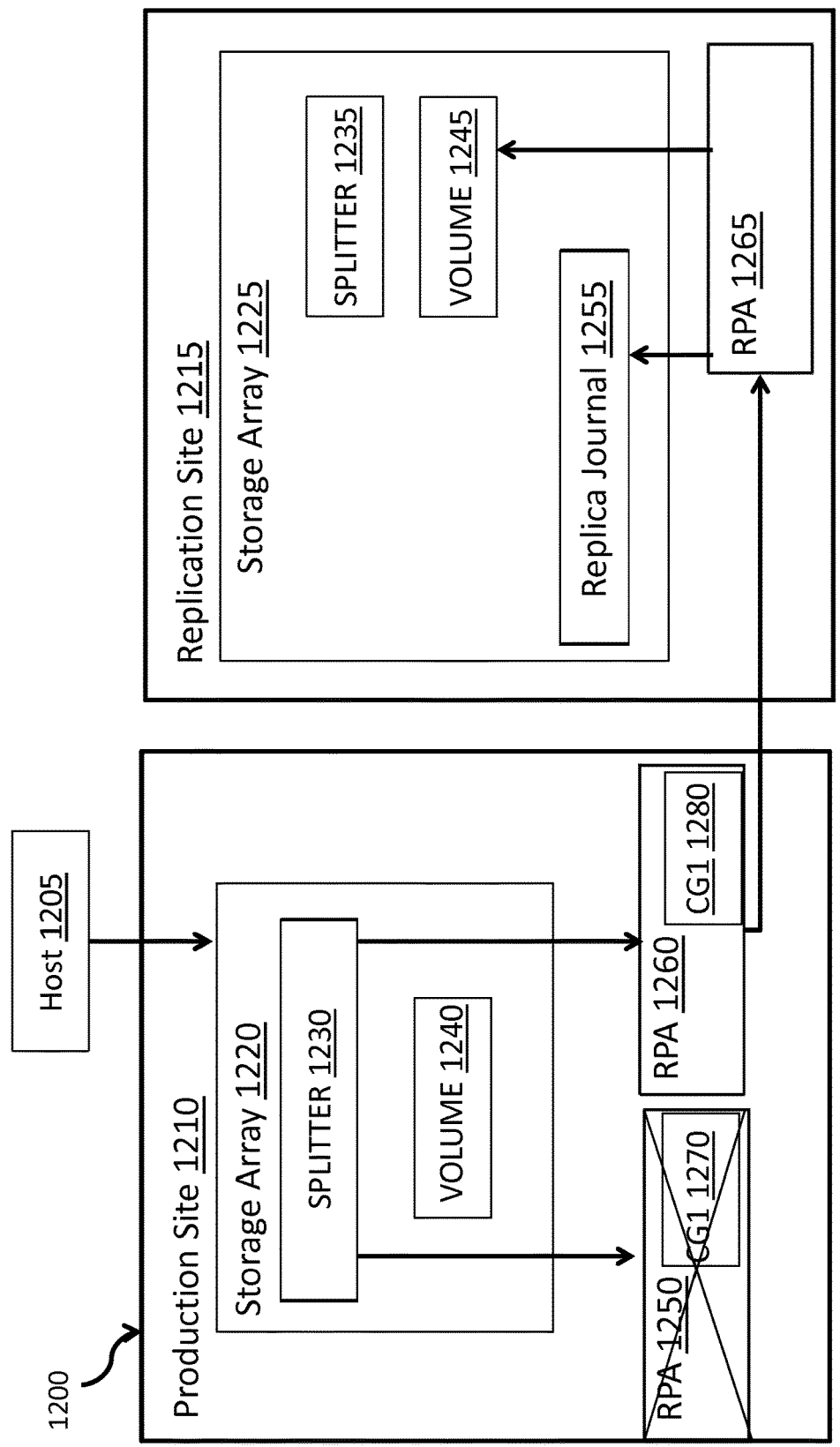
FIG. 12 is a simplified illustration of a block diagram of a fault tolerance system for allowing asynchronous replication to continue with no lag increase due to RPA failure in accordance with an embodiment of present disclosure.

Refer now to the example embodiment of FIG. 12, which is a simplified illustration of a block diagram of fault tolerance system for allowing asynchronous replication to continue with no lag increase due to RPA failure. System 1200 includes production site 1210 and replication site 1215. Production site 1210 includes Storage Array 1220, RPA 1250, and RPA 1260. Storage Array 1220 includes volume 1240 and splitter 1230. RPA 1250 includes CG1 1270. RPA 1260 includes shadow copy CG1 1280. Shadow copy CG1 1280 is a shadow copy of CG1 1270. Replication site 1215 includes Storage Array 1225 and RPA 1265. RPA 1265 manages replica copy of CG1 1280. Once shadow copy CG1 1280 is created, either a shadow copy of shadow copy CG1 1280 will be created at RPA 1265 or another RPA that includes a shadow copy of shadow copy CG1 1280 will be created at the replication site 1215. Storage Array 1225 includes volume 1245, splitter 1235, and replica journal 1255.

Figure 13:
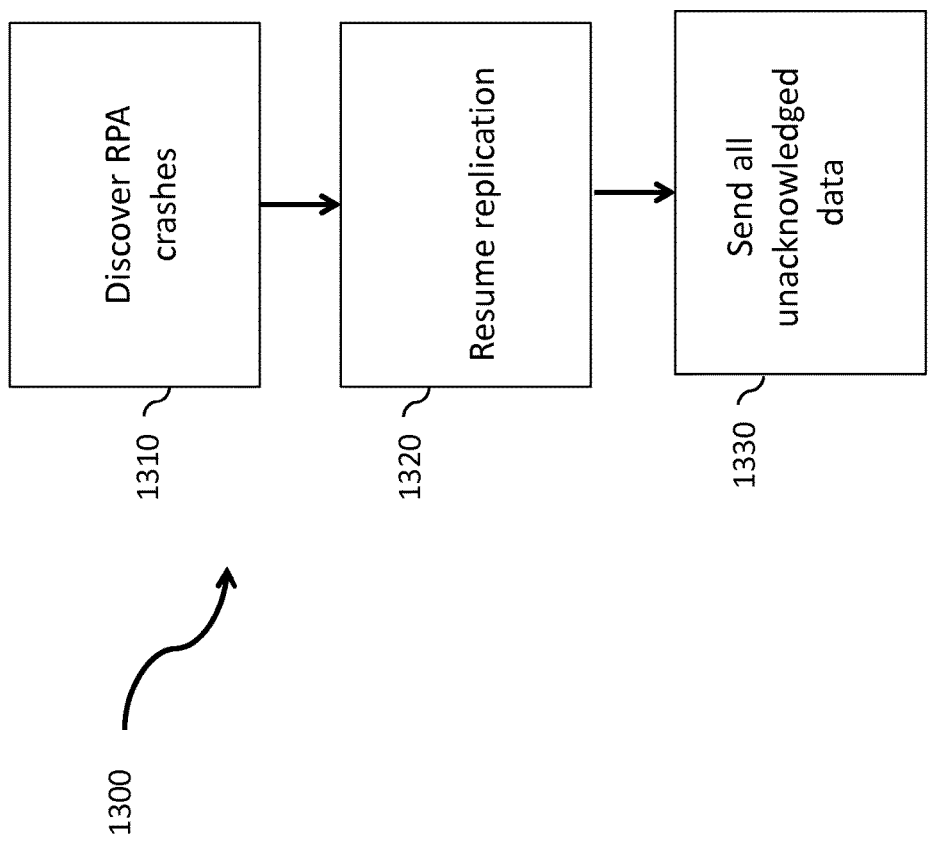
FIG. 13 is a simplified block diagram illustrating a fault tolerance method for allowing asynchronous replication to continue with no lag increase due to RPA failure in accordance with an embodiment of present disclosure.

Refer now to the example embodiment of FIG. 9, FIG. 12, and FIG. 13. FIG. 13 is a simplified block diagram illustrating a fault tolerance system for allowing asynchronous replication to continue with no lag increase due to RPA failure. In FIG. 12, splitter 1230 intercepts data directed to volume 1240 (step 910). Splitter 1230 simultaneously copies data to CG1 1270 (step 920) and to shadow copy CG1 1280 (step 940). RPA 1250 replicates data and flushes data from CG1 1270 to replica journal 1255 through RPA 1265 (step 1110). Shadow copy CG1 1280 stores data in cache memory (step 950). RPA 1260 discovers RPA 1250 crashed (step 1310). RPA 1260 sends data to RPA 1265 (step 930). RPA 1265 sends IO data to replica journal 1255 and a replica copy to volume 1245 (step 940). RPA 1260 starts to send all unacknowledged data from cache memory to replica journal 1255 through RPA 1265 (step 1330).

Figure 14:
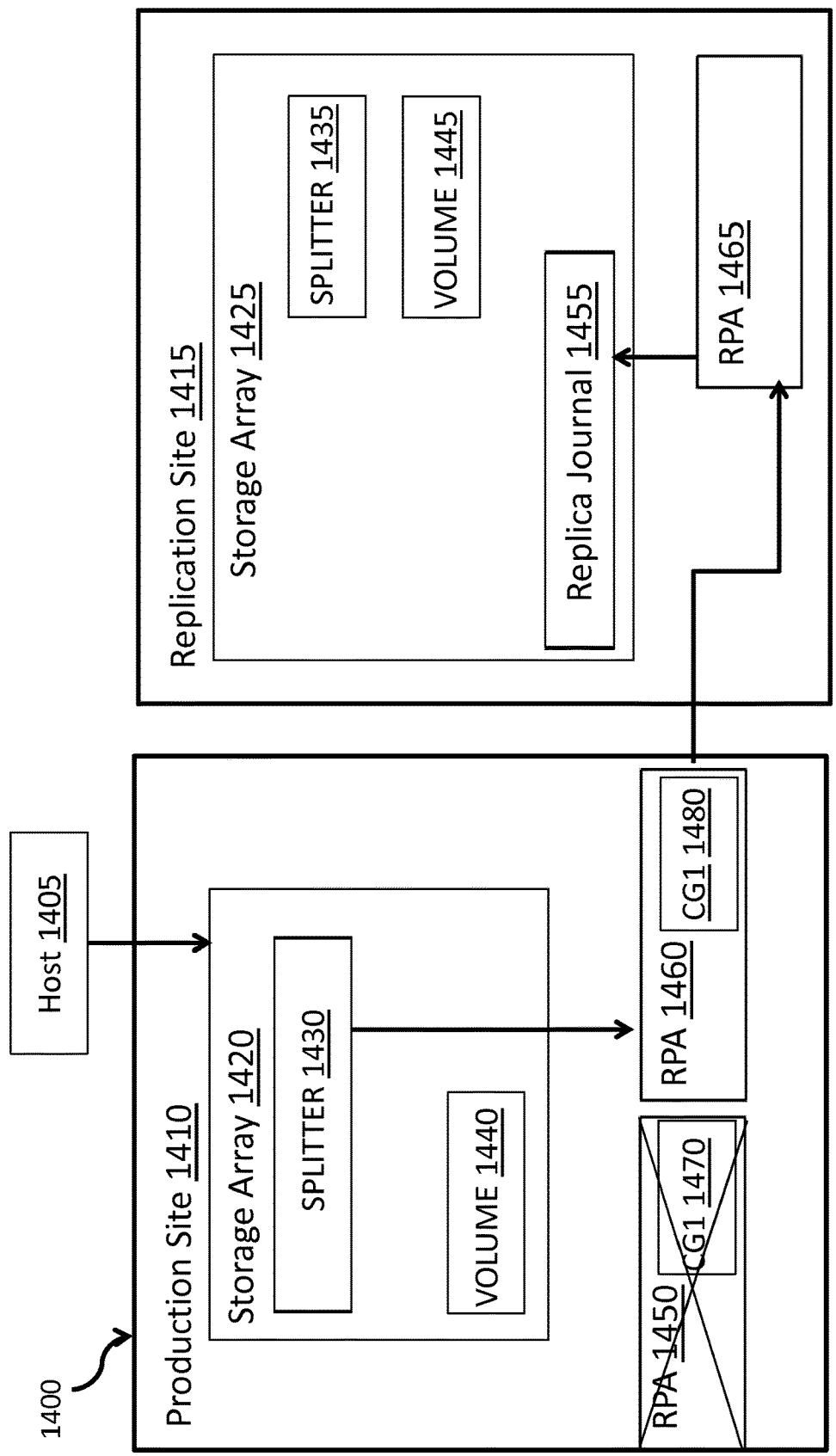
FIG. 14 is a simplified illustration of a block diagram of a system of handling failure of a synchronous replication consistency group (CG) preventing lost IOs by resuming replication on anther RPA in accordance with an embodiment of present disclosure.

Refer now to the example embodiment of FIG. 14, which is a block diagram of a simplified illustration of system for handling failure of a synchronous replication consistency group (CG) preventing lost IOs by resuming replication on another RPA. In FIG. 14, system 1400 includes production site 1410 and replication site 1415. Production site 1610 includes Storage Array 1620, RPA 1450 and RPA 1460.

Storage Array 1420 includes volume 1430 and splitter 1440. RPA 1450 includes CG1 1470. RPA 1460 includes shadow copy CG1 1480. Replication site 1615 includes Storage Array 1425 and RPA 1465. RPA 1465 manages replica copy of CG1 1480. Once shadow copy CG1 1480 is created, either a shadow copy of shadow copy CG1 1480 will be created at RPA 1465 or another RPA that includes a shadow copy of shadow copy CG1 1480 will be created at the replication site 1415. Storage Array 1425 includes volume 1435, splitter 1445 and replica journal 1455.

Figure 15:
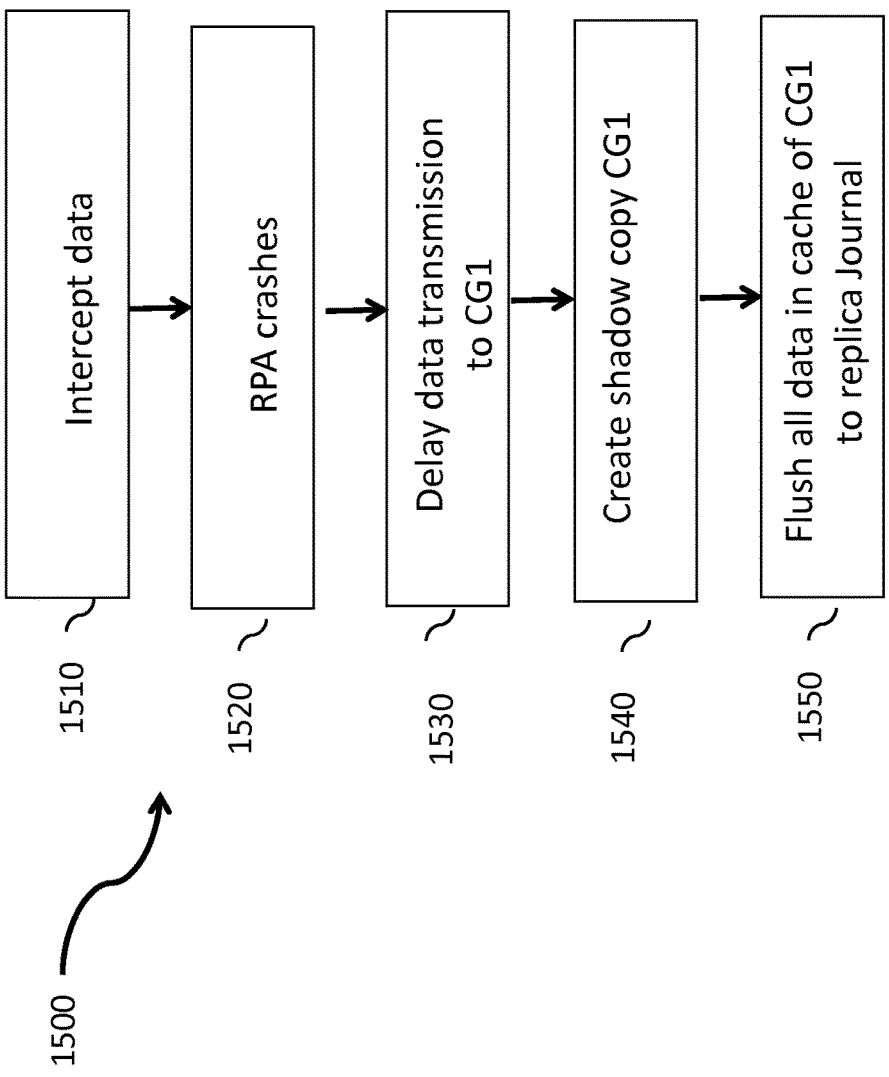
FIG. 15 is a simplified block diagram illustrating a method of handling failure of a synchronous replication consistency group (CG) preventing lost IOs by resuming replication on anther RPA in accordance with an embodiment of present disclosure.

Refer now to the example embodiment of FIG. 14 and FIG. 15. FIG. 15 is a block diagram of a simplified illustration of a method for handling failure of a synchronous replication consistency group (CG) preventing lost IOs by resuming replication on anther RPA. In FIG. 14, splitter 1430 intercepts data directed to volume 1440 (step 1710). RPA 1450 crashes (step 1520). Splitter 1430 delays transmission of data to CG1 1470 (step 1530). Production site 1410 creates RPA 1460 and shadow copy CG1 1480 (1540). CG1 1460 flushes all data to replica journal 1455 through RPA 1465 (step 1550).

Figure 16:
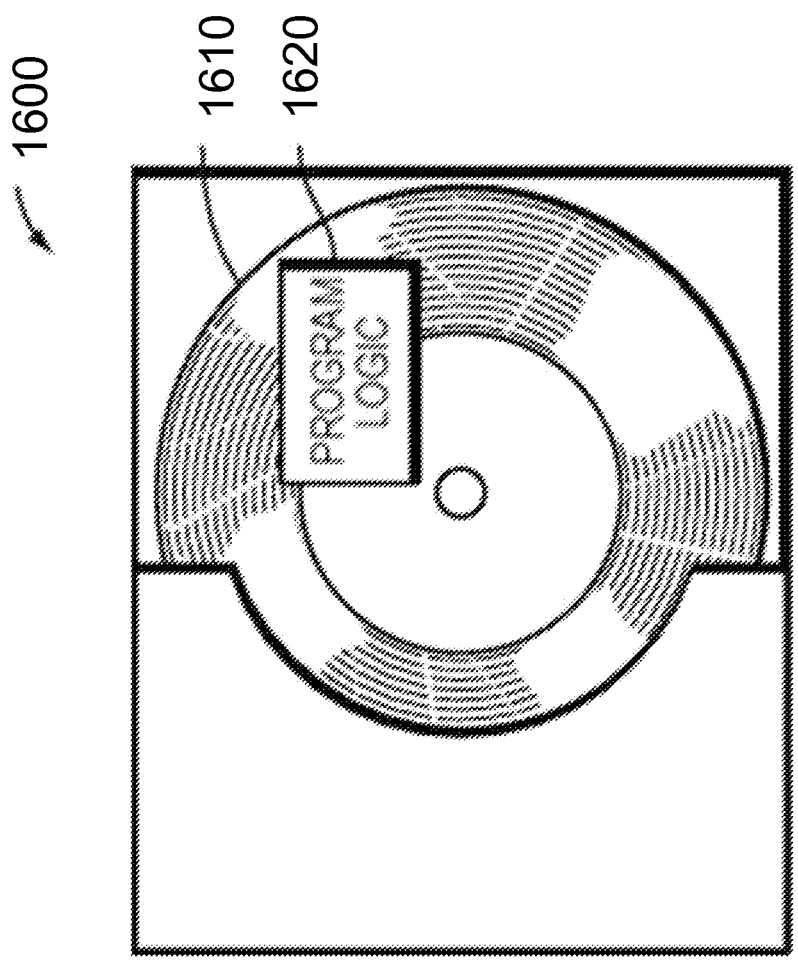
FIG. 16 is a diagram illustrating an example embodiment method of the present disclosure embodied as program code or a program product.

Refer now to the example embodiment of FIG. 16. FIG. 16 shows Program Logic 1620 embodied on a computer-readable medium 1610 as shown, and wherein the Program Logic 1620 is encoded in computer-executable code configured for carrying out the measurement and analysis process of this invention and thereby forming a Computer Program Product 1600.

The logic for carrying out the method may be embodied as part of the aforementioned system, which is useful for carrying out a method described with reference to embodiments shown in, for example, FIG. 3, FIG. 5, FIG. 7, FIG. 9, FIG. 11, FIG. 13, and FIG. 15. For purposes of illustrating the present invention, the invention is described as embodied in a specific configuration and using special logical arrangements, but one skilled in the art will appreciate that the device is not limited to the specific configuration but rather only by the claims included with this specification.

Figure 17:
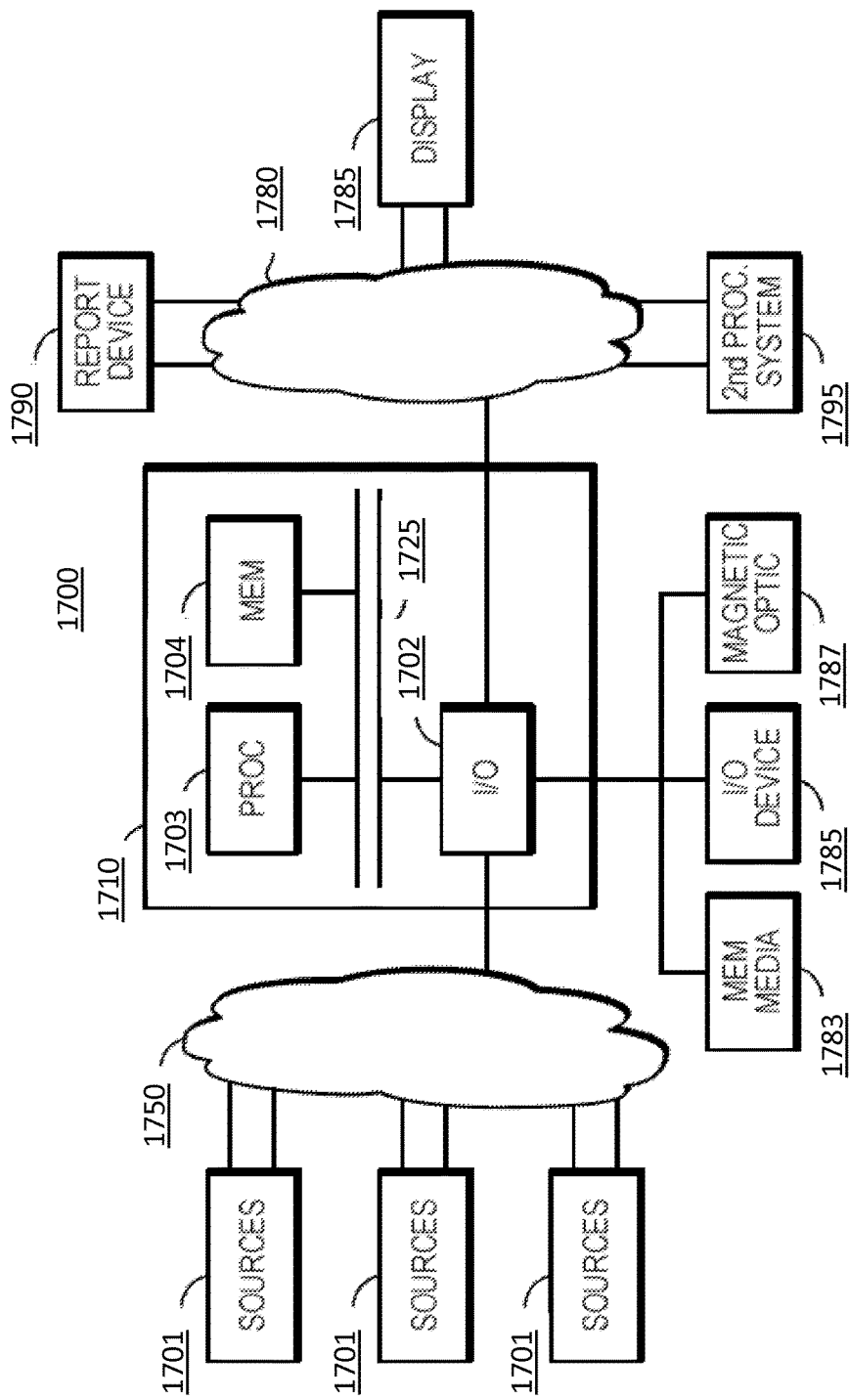
FIG. 17 is an example of an embodiment of an apparatus that may utilize the techniques described herein, in accordance with an embodiment of the present disclosure.

Refer now to the example embodiment of FIG. 17. The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 17, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. A processor may be a physical processor or one or a virtual processor. In certain embodiments, a virtual processor may correspond to one or more or parts of one or more physical processors.

The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

What is claimed is:

1. A computer implemented method providing fault tolerance in a replication environment, the method comprising:

creating a first consistency group (CG) comprising a set of volumes on a production site to be replicated to a replication site using a first replication protection appliance on the production site and a shadow copy CG using a second replication protection appliance on the production site; wherein the second replication protection appliance has memory;

sending a first copy of input/output data (IO data) directed to the set of volumes on the production site, via a splitter on the production site, to the first CG using the first replication protection appliance;

sending a second copy of the IO data directed to the set of volumes, via the splitter, to the shadow copy CG on the second protection replication appliance, wherein the shadow copy CG stores the second copy of the IO data in the memory of the second replication protection appliance;

flushing, by the first replication protection appliance, the first copy of IO data to a replica RPA at a replication site;

releasing, by the second replication protection appliance, the second copy of IO data to the replica RPA at the replication site;

tracking, by the splitter, dirty regions during a momentary pause; and synchronizing, upon completion of a flipover, only the dirty regions, wherein the flipover includes reassigning at least one CG selected from the group consisting of the first CG and the shadow copy CG from its associated replication protection appliance to another replication protection appliance.

2. The method of claim 1, wherein the IO data in memory of the shadow copy CG is erased after receiving an acknowledgement of receipt of the first copy of the IO data by the replication site.

3. The method of claim 1, further comprising detecting failure of the first replication appliance.

4. The method of claim 3, further comprising starting replication from the second replication protection appliance to the replica RPA at the replication site and sending all unacknowledged IO data to the replication site from the second replication protection appliance.

5. The method of claim 1, further comprising the replication RPA sending the IO data to a replica journal and at the replication site and to a replica volume at the replication site.

6. A computer program product providing fault tolerance in a replication environment, the computer program product comprising:

a non-transitory computer-readable storage medium encoded with computer-executable program code enabling:

creating a first consistency group (CG) comprising a set of volumes on a production site to be replicated to a replication site using a first replication protection appliance on the production site and a shadow copy CG using a second replication protection appliance on the production site; wherein the second replication protection appliance has memory;

sending a first copy of input/output data (IO data) directed to the set of volumes on the production site, via a splitter on the production site, to the first CG using the first replication protection appliance;

sending a second copy of the IO data directed to the set of volumes, via the splitter, to the shadow copy CG on the second protection replication appliance, wherein the shadow copy CG stores the second copy of the IO data in the memory of the second replication protection appliance;

flushing, by the first replication protection appliance, the first copy of IO data to a replica RPA at a replication site;

releasing, by the second replication protection appliance, the second copy of IO data to the replica RPA at the replication site;

tracking, by the splitter, dirty regions during a momentary pause; and synchronizing, upon completion of a flipover, only the dirty regions, wherein the flipover includes reassigning at least one CG selected from the group consisting of the first CG and the shadow copy CG from its associated replication protection appliance to another replication protection appliance.

7. The computer program product of claim 6, wherein the IO data in memory of the shadow copy CG is erased after receiving an acknowledgement of receipt of the first copy of the IO data by the replication site.

8. The computer program product of claim 6, further comprising detecting failure of the first replication appliance.

9. The computer program product of claim 8, further comprising starting replication from the second replication protection appliance to the replication RPA at the replication site and sending all unacknowledged IO data to the replication site from the second replication protection appliance.

10. The computer program product of claim 6, further comprising the replication RPA sending the IO data to a replica journal and at the replication site and to a replica volume at the replication site.

11. A system for providing fault tolerance in a replication environment, the system comprising:

a splitter on a production site;

a computer having a memory and a processor;

computer-executable program code operating in the memory on the processor, wherein the computer-executable program code is configured to enable a processor to execute the following:

creating a first consistency group (CG) comprising a set of volumes on a production site to be replicated to a replication site using a first replication protection appliance on the production site and a shadow copy CG using a second replication protection appliance on the production site; wherein the second replication protection appliance has memory;

sending a first copy of input/output data (IO data) directed to the set of volumes on the production site, via the splitter, to the first CG using the first replication protection appliance;

sending a second copy of the IO data directed to the set of volumes, via the splitter, to the shadow copy CG on the second protection replication appliance, wherein the shadow copy CG stores the second copy of the IO data in the memory of the second replication protection appliance;

flushing, by the first replication protection appliance, the first copy of IO data to a replica RPA at a replication site;

releasing, by the second replication protection appliance, the second copy of IO data to the replica RPA at the replication site;

tracking, by the splitter, dirty regions during a momentary pause; and synchronizing, upon completion of a flipover, only the dirty regions, wherein the flipover includes reassigning at least one CG selected from the group consisting of the first CG and the shadow copy CG from its associated replication protection appliance to another replication protection appliance.

12. The system of claim 11, wherein the IO data in memory of the shadow copy CG is erased after receiving an acknowledgement of receipt of the first copy of the IO data by the replication site.

13. The system of claim 11, further comprising detecting failure of the first replication appliance.

14. The system of claim 13, further comprising starting replication from the second replication protection appliance to the replica RPA at the replication site and sending all unacknowledged IO data to the replication site from the second replication protection appliance.

15. The system of claim 11, further comprising the replica RPA sending the IO data to a replication journal and at the replication site and to a replica volume at the replication site.

* * * * *